UNITED STATES PATENT OFFICE.

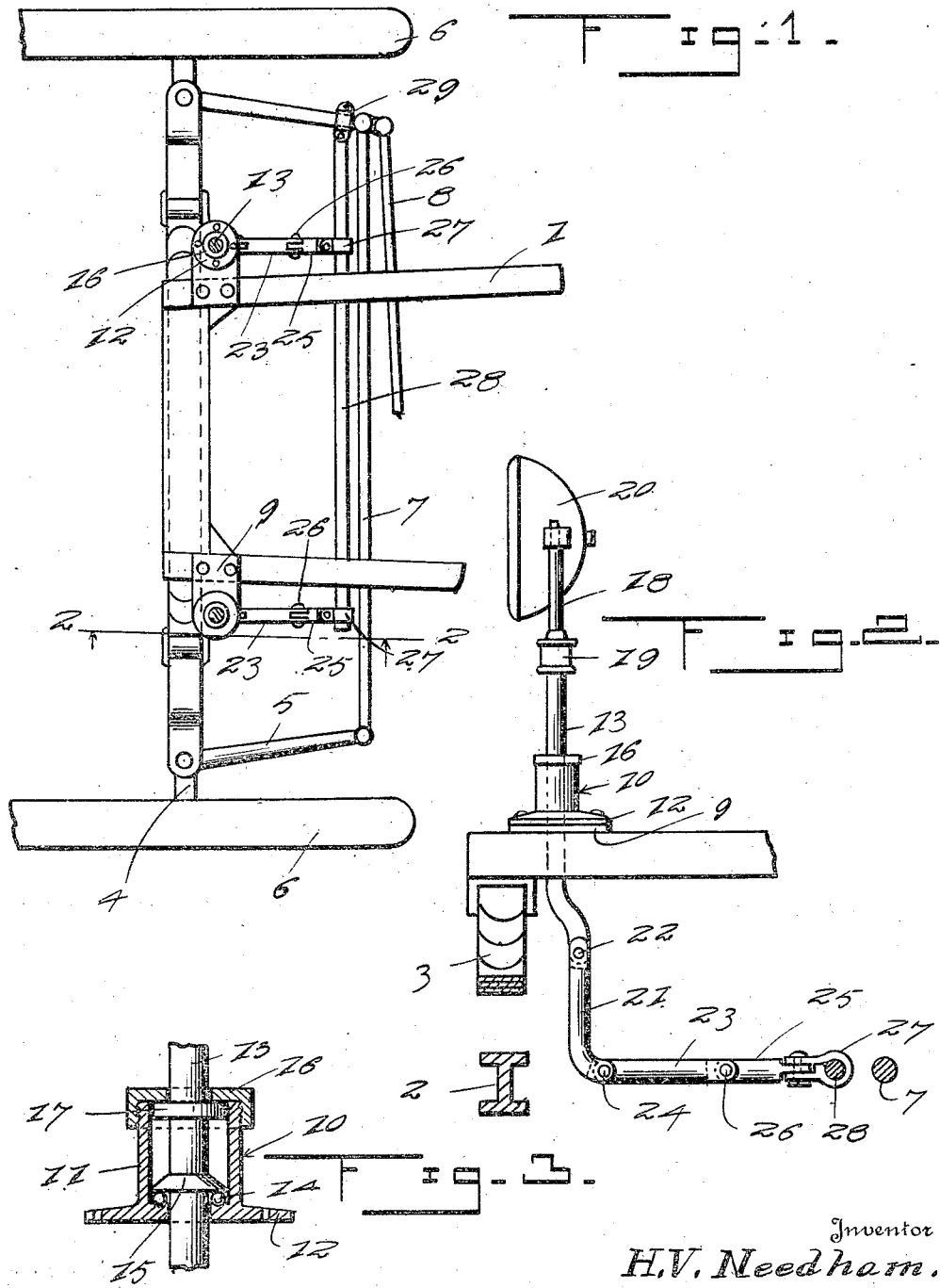

HARLEY V. NEEDHAM, OF NEOSHO, MISSOURI.

DIRIGIBLE AUTOMOBILE-HEADLIGHT.

1,212,095.

Specification of Letters Patent.

Patented Jan. 9, 1917.

Application filed October 7, 1916. Serial No. 124,324.

*To all whom it may concern:*

Be it known that I, HARLEY V. NEEDHAM, a citizen of the United States, residing at Neosho, in the county of Newton and State of Missouri, have invented certain new and useful Improvements in Dirigible Automobile-Headlights; and I do hereby declare the following to be a full, clear, and exact description of the invention, such as will enable others skilled in the art to which it appertains to make and use the same.

This invention relates to dirigible automobile headlights, and has for its primary object the provision of means for connecting the headlights with the steering knuckle of the automobile to turn the headlights in a corresponding direction with the front wheels whereby curves in a roadway will be illuminated as the rays of light from the headlights will be directed in the path of the front wheels at all times.

Another object of this invention is to provide lamp standards journaled to the automobile and carrying headlights and so connected to an operating rod which is connected to one of the steering knuckles of the automobile that the headlights will be turned in a corresponding direction with the front wheels and that the operating rod is capable of vertical movement without affecting the lamp standards, thus obviating vibrations and shocks to the headlight when the automobile is passing over uneven ground.

A still further object of this invention is the provision of dirigible automobile headlights of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which—

Figure 1 is a top plan view partly in section of dirigible automobile-headlights constructed in accordance with my invention, Fig. 2 is a longitudinal sectional view taken on the line 2—2 of Fig. 1 illustrating the connection between the lamp standards and the operating rods, and Fig. 3 is a detail sectional view of the journal for the lamp standards.

Referring in detail to the drawing, the numeral 1 indicates the chassis of an automobile secured to the front axle 2 by means of a spring 3. The front axle 2 is of the usual construction employing the stub axles 4 having the usual steering knuckles 5. The stub axles 4 have the usual wheels 6 journaled thereon. The stub axles 4 are connected together by the connecting rod 7 having the usual steering rod 8 connected thereto. The foregoing description relates to a well known type of automobile, to which my invention is applied. Suitable brackets 9 are bolted or otherwise secured to the chassis 1 and each are apertured and have bolted thereon bearings or journals 10 consisting of cylindrical sleeves 11 having flanges 12 formed upon their lower ends which are bolted or otherwise secured to the brackets 9. The sleeves 11 have journaled therein lamp standards 13 which extend downwardly through the brackets 9 as clearly illustrated in Fig. 2. The sleeves 11 have raceways formed therein for receiving ball bearings 14 which bear against collars 15 formed upon the lamp standards 13. The upper ends of the sleeves 11 are screw threaded to receive a dust cap 16. Suitable collars 17 are formed upon the lamp standards 13 and engage the dust caps 16 to limit the upward movement of the lamp standards within the sleeves 11. Lamp forks 18 are secured to the upper ends of the lamp standards 13 by means of couplings 19 and have secured thereto suitable headlights 20 which may be of any desired construction.

Links 21 are hinged to the lower ends of the lamp standards 13 as illustrated at 22 and have their lower ends curved rearwardly and hinged to horizontally disposed links 23 as illustrated at 24. The horizontally disposed links 23 are hinged to arms 25 as illustrated at 26 and the arms 25 are pivotally connected to clamps 27 which are rigidly secured to an operating rod 28 which extends parallel with the connecting rod 7 and is pivotally secured to a clamp 29 which is secured to one of the steering knuckles 5.

From the foregoing description taken in connection with the accompanying drawing, it will be noted when the front wheels 6 of the automobile are turned to the right, the steering knuckles 5 move to the left, causing the operating rod 28 to move in a corresponding direction turning the lamp standards and headlights to the right so that the rays of light from the headlights 20 will be directed in the path of the front wheels when turned to the right. When the front wheels 6 are turned to the left, the steering knuckles move to the right and move the operating rod 28 in a corresponding direction causing the headlights 20 to be turned to the left so that the rays of light therefrom will be directed in the path of the wheels when turned to the left. It will also be noted that when the automobile passes over uneven ground the operating rod is capable of moving upwardly and downwardly without interfering with the lamp standards, as the links 21 and 23 establish a connection between the lamp standards and the operating rod that it will permit the operating rod to move freely upwardly and downwardly without interfering or transmitting a similar movement to the lamp standards, thus obviating all vibrations to the headlights 20.

While I have shown and described the preferred embodiment of my invention, it will be understood that minor changes in construction, combination and arrangement of parts may be made without departing from the spirit and scope of the invention as claimed.

What is claimed is:

In combination, an automobile including a chassis and a steering mechanism, of a bracket secured to the chassis and having openings therein, a sleeve secured to said bracket, ball bearings located within said sleeve, a lamp standard extending through the sleeve, a collar formed on the lamp standard and bearing upon the ball bearings, a dust cap secured to the sleeve, a collar secured to the lamp standard and bearing against the dust cap to limit the upward movement of the lamp standard, a headlight secured to the lamp standard, and means for connecting the lamp standard to the steering mechanism to turn the headlight.

In testimony whereof I affix my signature in presence of two witnesses.

HARLEY V. NEEDHAM.

Witnesses:
J. M. DAVIDSON,
L. T. SHELDON.